(12) United States Patent
Kuebert et al.

(10) Patent No.: US 8,103,521 B2
(45) Date of Patent: *Jan. 24, 2012

(54) FLEXIBLE MAIL DELIVERY SYSTEM AND METHOD

(75) Inventors: Edward J. Kuebert, Warrenton, VA (US); Scott R. Bombaugh, Burke, VA (US); William J. Dowling, Venice, FL (US)

(73) Assignee: United States Postal Service, Washington, DC (US)

( * ) Notice: Subject to any disclaimer, the term of this patent is extended or adjusted under 35 U.S.C. 154(b) by 5 days.

This patent is subject to a terminal disclaimer.

(21) Appl. No.: 12/654,554

(22) Filed: Dec. 23, 2009

(65) Prior Publication Data

US 2010/0100497 A1 Apr. 22, 2010

Related U.S. Application Data

(63) Continuation of application No. 09/976,039, filed on Oct. 15, 2001, now Pat. No. 7,647,231.

(60) Provisional application No. 60/239,926, filed on Oct. 13, 2000.

(51) Int. Cl.
G06Q 10/00 (2006.01)
G06Q 30/00 (2006.01)
G06F 17/00 (2006.01)

(52) U.S. Cl. ...... 705/1.1; 705/26.82; 705/330; 705/332; 705/400

(58) Field of Classification Search ............... 705/1.1, 705/26.82, 330, 332, 400
See application file for complete search history.

(56) References Cited

U.S. PATENT DOCUMENTS

| | | | |
|---|---|---|---|
| 5,624,071 A | 4/1997 | Sosan | |
| 5,648,770 A | 7/1997 | Ross | |
| 5,703,783 A | 12/1997 | Allen et al. | |
| 5,830,860 A | 11/1998 | Gray et al. | |
| 6,401,078 B1 | 6/2002 | Roberts et al. | |
| 6,539,360 B1 | 3/2003 | Kadaba | |
| 6,634,551 B2 | 10/2003 | Barta et al. | |
| 6,975,998 B1 | 12/2005 | Jones | |
| 7,035,856 B1 | 4/2006 | Morimoto | |
| 2002/0029202 A1* | 3/2002 | Lopez | 705/406 |
| 2002/0032573 A1 | 3/2002 | Williams et al. | |
| 2002/0032623 A1* | 3/2002 | Wheeler et al. | 705/28 |
| 2002/0046194 A1* | 4/2002 | Gelfer | 705/401 |

(Continued)

OTHER PUBLICATIONS

PR Newswire, "ABF Freight System, Inc. Announces $25 Trial Credit for Customer Use of New Web Site Tools", Apr. 13, 2000, PR Newswire.

(Continued)

*Primary Examiner* — Fadey Jabr
(74) *Attorney, Agent, or Firm* — Finnegan, Henderson, Farabow, Garrett & Dunner, LLP

(57) ABSTRACT

The principles of the present invention provide the ability to flexibly change the delivery point and time for a mail item, while the item is en route. The recipient, sender, or mailer may flexibly change the delivery point of the item alone or in combination with each other. While an item is en route between the sending point and the delivery point, a notification is sent to indicate that the item is in transit. In response, the delivery of the item may be changed. For example, the destination specified by the sender (e.g., the delivery address written on the item) may be changed or a delivery time may be specified. The item is then delivered to the new delivery point and/or at the specified delivery time.

5 Claims, 2 Drawing Sheets

U.S. PATENT DOCUMENTS

| | | |
|---|---|---|
| 2002/0103697 A1* | 8/2002 | Lockhart et al. ................ 705/14 |
| 2003/0173405 A1 | 9/2003 | Wilz, Sr. et al. |
| 2003/0233190 A1 | 12/2003 | Jones |
| 2004/0128207 A1 | 7/2004 | Ray |
| 2004/0193314 A1 | 9/2004 | Tilles et al. |
| 2004/0211834 A1 | 10/2004 | Fleckenstein et al. |
| 2005/0038758 A1* | 2/2005 | Hilbush et al. ................ 705/402 |

OTHER PUBLICATIONS

PR Newswire, "No More Disappearing Shipment Information With My Tracking on My Yellow Website", Aug. 7, 2000, PR Newswire.

PR Newswire, "UPS Sonic Air BestFlight (SM) Assures Consistent Flight Selection, Proactive Flight Monitoring", May 20, 1999, PR Newswire pp. 4437.

\* cited by examiner

FLEXIBLE MAIL DELIVERY SYSTEM AND METHOD

CROSS REFERENCE TO RELATED APPLICATION

This application is a continuation of U.S. patent application Ser. No. 09/976,039, filed Oct. 15, 2001 now U.S. Pat. No. 7,647,231, and claims the benefit of U.S. Provisional Patent Application No. 60/239,926, filed Oct. 13, 2000, the disclosures of which are expressly incorporated herein by reference in their entirety.

FIELD OF THE INVENTION

The present invention relates to dynamically changing the delivery point of an item while the item is en route to a destination. More particularly, the invention relates to methods and systems for dynamically redirecting an item, such as a parcel, to a new delivery point, flexibly specified, before the parcel is delivered to the originally addressed delivery point.

BACKGROUND OF THE INVENTION

In today's conventional delivery systems, the sender of an item, for example, a parcel, places the recipient's name and address on the item to specify the delivery point, and gives it to a delivery service to deliver. While the item is en route to the delivery point, conventional delivery systems often allow the sender of an item to track the item's progress from the sending point to the delivery point. Such systems typically use a unique identification tag, such as a bar code label, to identify the item and track it. As the item passes through various locations along the route to the delivery point, the tag is scanned and information regarding the item's current location is updated. Using the tag's identification number, the sender can access the current location information and follow the progress of the item.

Some conventional systems also allow a recipient to track an item en route to the recipient's delivery point, if the recipient knows the identification tag number associated with the item. For example, if a person purchases an item online or via the telephone, the seller may provide a "tracking number" for the item, with which the buyer can learn the item's current location en route. The buyer may use the delivery service's web site, or call a telephone number to learn the current location of the item.

Several problems exist, however, with today's conventional delivery systems. First, conventional delivery systems are typically inflexible regarding timing of deliveries—the delivery service simply brings the item to the delivery point when it is convenient for the deliverer. This is inconvenient for the recipient and causes missed deliveries if the recipient is unable to wait at the delivery point according to the deliverer's schedule. If the recipient cannot arrange to wait for delivery, they must either pick the item up from the delivery service or arrange a new delivery time.

Second, conventional systems deliver to a single static delivery point that is specified at the time of shipping when the sender places the recipient's name and address on the item being shipped. This is inconvenient and inefficient if the recipient cannot be at the delivery point when the delivery service arrives with the item. When this happens, delivery is delayed as the delivery service must keep the item and attempt to contact the recipient to arrange redelivery at a different time. Naturally, a recipient would prefer delivery to a location where he can accept it.

There are other reasons a recipient may wish to have an item delivered to a delivery point other than the one specified by the sender For example, if a recipient learns that a parcel is going to be delivered to his house tomorrow, but he cannot receive the parcel because he must make a last minute out-of-town business trip, he may wish to have the parcel delivered to his out-of-town hotel. A recipient may also wish to redirect delivery of a perishable item if the specified delivery point is not conducive to preserving it; or redirect the delivery of an item having special physical characteristics, such as high weight or large size, that cannot be accommodated at the specified delivery point. Or, the recipient may just wish to redirect delivery of an item for convenience sake.

Accordingly, a need exists for systems and methods of item delivery that allow a recipient to flexibly customize the delivery point and delivery time while the item is en route. There is a need to provide recipients with the ability to redirect an item to a new delivery point and to specify the time of delivery at the delivery point, based on information about the item. Further, there is a need for item delivery systems and methods that enable a sender to flexibly specify the return delivery point for an item that is returned (e.g., when the sender becomes the new recipient because the item was undeliverable to the addressee).

SUMMARY OF THE INVENTION

In accordance an embodiment consistent with the principles of the present invention, a method for changing the delivery point of a mail item while the item is en route comprises determining a first delivery point of the item; notifying, based on the first delivery point, a recipient that the item is en route; accepting a second delivery point or confirming the initial delivery point; and delivering the item to the second delivery point.

Additional features of the invention will be set forth in part in the description which follows, and in part will be obvious from the description, or may be learned by practice of the invention. The features of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Systems and methods consistent with the principles of the present invention provide the ability to specify the delivery point and time for the mail item being delivered, while the item is en route. In addition, the principles of the present invention allow the recipient, sender, or mailer to flexibly to act alone or in combination with each other when changing the delivery point and/or time of the mail item. While a mail item, such as a parcel, is en route between the sending point and the delivery point, a notification is sent to indicate that the parcel is in transit. In response, the delivery of the mail item may be changed. For example, the destination specified by the sender (e.g., the delivery address written on the parcel) may be changed or a delivery time may be specified. The mail item is then delivered to the new delivery point and/or at the specified delivery time.

Reference will now be made in detail to specific exemplary embodiments of the invention. Wherever possible, the same reference numbers will be used throughout the description to refer to the same or like parts. The invention is described using embodiments involving United States Postal Service (USPS) equipment and systems. One of ordinary skill in the art will recognize, however, that the principles of the present invention apply to a wide variety of delivery systems and methods and are not limited to the specific embodiments described.

System Overview

Figure 1:
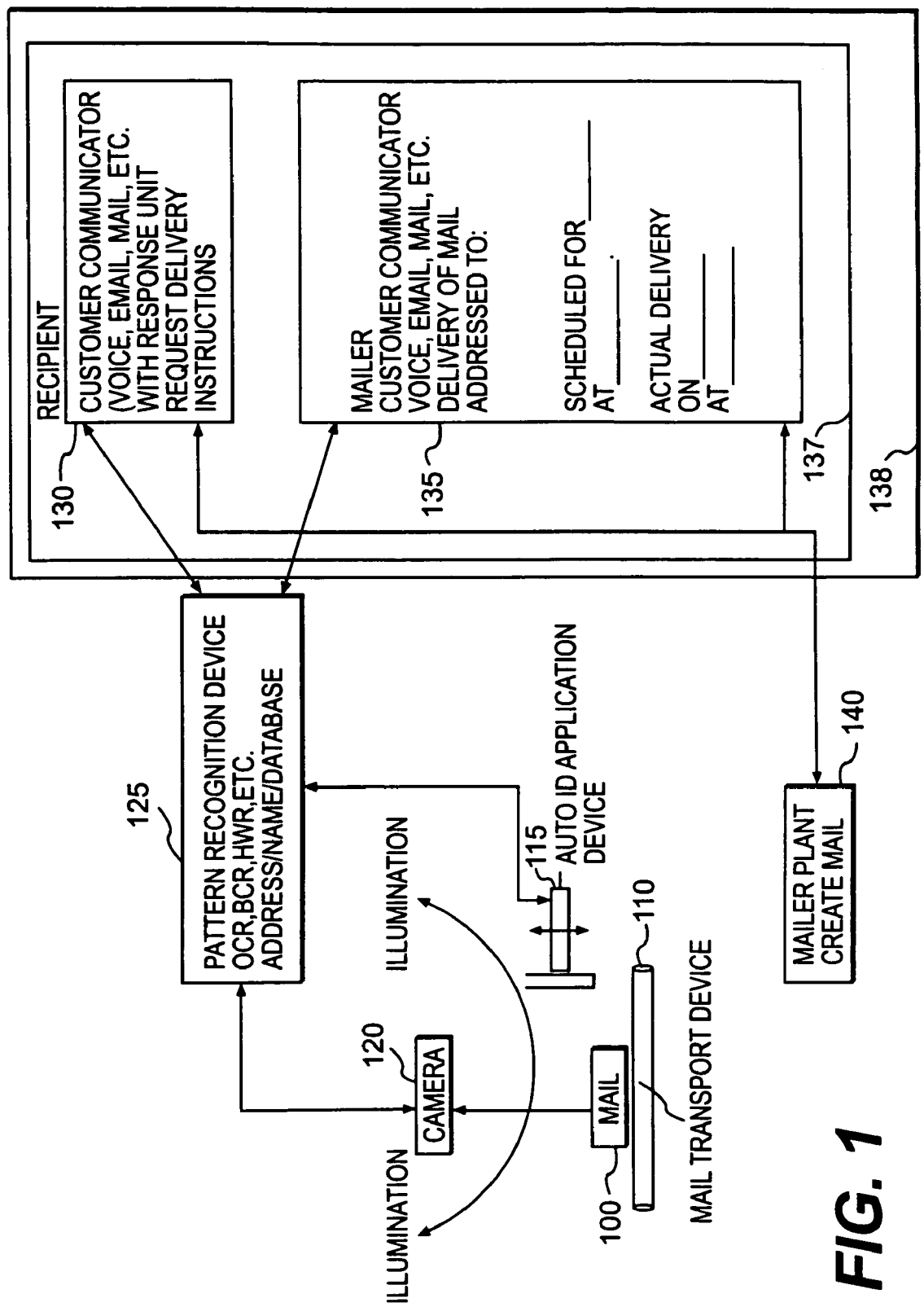
FIG. 1 is a block diagram of an exemplary system for flexible delivery of a mail item consistent with the principles of the present invention.

FIG. 1 is a block diagram of an exemplary system for flexible delivery of a mail item consistent with the principles of the present invention. As shown, a mail item 100 is moved from right to left by a mail transport device 110. Mail item 100 may be any type of item known to those skilled in the art, such as a parcel, a letter, or a package. As it moves, mail item 100 passes through an illuminated area under a camera 120. Camera 120 records an image of mail item 100, including its mailing label, upon which is written a recipient's address and a return address for the sender.

In one embodiment consistent with the principles of the present invention, camera 120 sends the image to a pattern recognition device 125, which performs an optical character reading (OCR) function or handwriting recognition (HWR) function. The OCR/HWR function uses the characters of the destination address to determine a delivery point for mail item 100, such as a name and a Zip-plus-four-plus-two code. The OCR/HWR function also determines who the sender is by reading the return address. If mail item 100 does not already include an automatic identification tag, then an auto ID application device 115 places an automatic identification tag on mail item 100. The automatic identification tag may be, for example, a bar code, data matrix code, or radio-frequency identification device.

At about the same time, pattern recognition device 125 creates a database entry, indexed by the identification tag number, that includes a recipient information section 130 and a sender information section 135. Recipient information section 130 contains information such as the delivery point, the recipient's name, and notification channels for communicating with the recipient, such as the recipient's phone number and email address. Mailer information section 135 contains information such as the return address, the sender's name, notification channels for communicating with the sender, such as the sender's phone number and email address, and a scheduled delivery date for mail item 100. The database entry may also include other information about mail item 100, such as its size, its weight, and an image of mail item 100 taken by camera 120. The database entries may be stored in a database 137 maintained by a computer system 138. Various implementations for database 137 and computer system 138 are known to those skilled in the art, and thus need not be described in detail here.

In another embodiment consistent with the principles of the present invention, the OCR and identification tag application functions are not necessary because the sender has already placed an identification tag on mail item 100. In this embodiment, camera 120 takes an image of the identification tag on mail item 100 and pattern recognition device 125 performs a bar code reader (BCR) function to discern the identification number. Pattern recognition device 125 uses the identification number to index to a database entry containing information concerning mail item 100, such as the delivery point, recipient, return address, and other information as just described. Obtaining this information using a database lookup function is much quicker and more accurate than using OCR for determining address and other information.

In another embodiment consistent with the principles of the present invention, a unique identification tag is not required for mail item 100. Instead, the delivery point address represented, for example, as a Zip-plus-four-plus-two Code, and the return address, represented as a Zip-plus-four-plus-two Code, are used as database indices for mail item 100. The mailing date and time may also be used to help uniquely identify mail item 100's entry in the database.

Populating the Database

Once mail item 100 has a unique identification tag, or is otherwise identified, the identity of mail item 100 is used to access a database entry containing information about mail item 100, as described above. The database information may come from various sources. In one embodiment, information is gathered by the delivery service from mail item 100 itself. For example, sender name, return address, recipient name, and delivery address are gathered by camera 120 and pattern recognition device 125's OCR function. Mail item 100's weight and size may be gathered by automatically weighing and measuring it. In short, any characteristic discernable from an external inspection of mail item 100 can be gathered by the delivery service and put into the database.

If the sender gives mail item 100 a unique identity, (for example by affixing an identification tag), the sender may use a mailer plant 140 to create mail and supply a database containing all the information than can be gathered from an external inspection, plus additional information about mail item 100. For example, the sender can supply additional information about the contents of mail item 100 from mailer plant 140, its value, notification information for the sender (e.g., the recipient's email address and phone number), and notification information for the recipient (e.g. the sender's email address and phone number as supplied when the recipient ordered mail item 100). The sender can easily transfer this database to the delivery service when a batch of items, such as mail item 100, are shipped.

In another embodiment consistent with the principles of the present invention, the delivery service builds and maintains a secure, static database of information associated with each delivery point to which it delivers to. The static database is indexed by delivery point, such as Zip-plus-four-plus-two Code and contains, for example, the names of the different persons residing at that delivery point, and notification contact information for each, such as email address and phone number. The static database may also contain other information such as preapproved alternate delivery points, hold mail status, instructions for delivery times, common misspellings of recipients' names, etc. In short, the static database contains anything of a 'permanent' nature about the recipient, as contrasted to the 'temporary' information about mail item 100, which is no longer useful after mail item 100 is delivered. While static in nature this database may be regularly updated under secure conditions.

Using a static, predefined database to store notification contact information adds a fraud protection factor to the invention. Since the notification information prelinks a physical mailbox to a notification channel, such as an electronic mailbox or electronic address, the intended recipient is notified of any fraudulent redirection of mail item 100 to a new address. Moreover, if the 'recipient' instructions do not come from a predefined notification path for the recipient, as stored in the static database, they can be ignored as presumably fraudulent. Furthermore, in one embodiment, a recipient may only change delivery points to an address that is pre-recorded in the static database.

Process Overview

Figure 2:
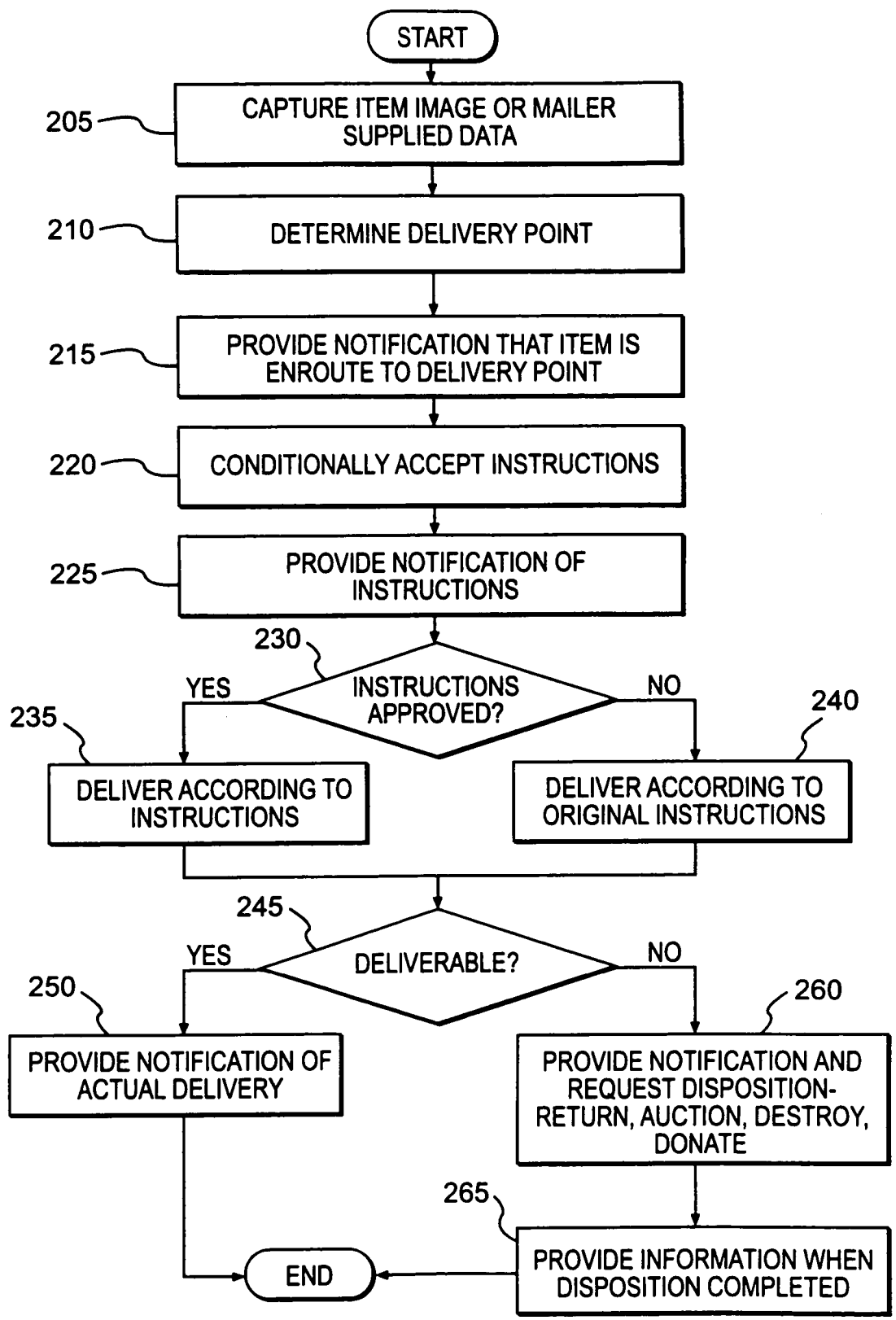
FIG. 2 is a flow chart of an exemplary process for flexible delivery of a mail item consistent with the principles of the present invention.

FIG. 2 is a flow chart of an exemplary process for flexible delivery of a mail item consistent with the principles of the present invention. In stage 205 of the embodiment shown, the process starts by capturing an image of the mail item being delivered, e.g., mail item 100. For example, the image may include delivery address and return address information. In addition, or as an alternative, the process may also capture data that contains the same type of information (e.g., the destination address and return address), which is supplied by the sender (e.g., a mailer).

In one embodiment, the image is captured by a conventional optical character reading apparatus (OCR), which takes an image of mail item 100 and "reads" the letters of the recipient's address and the sender's return address, converting them into electronic data usable by a data processing system. Various types of optical character reading apparatus are known to those skilled in the art, and thus need not be described in detail here. In another embodiment, the recipient's address and the sender's address information is supplied by the sender as electronic data, obviating the need to use an optical character reader to get the information off mail item 100.

Sender supplied data may also include other information about mail item 100, such as the parcel's size and weight of the mail item, the contents of the mail item, its expiration date, undeliverability instructions, etc. Alternatively, some or all of the same data may also be captured independently of the sender in a manner similar to an OCR capturing the address information, for example, by weighing and measuring mail item 100 to determine its weight and size.

Next, the process determines the delivery point from the image of mail item 100 and/or from the mailer supplied data (stage 210). In one embodiment, as is well known in the art, an OCR reads the characters of the delivery address on mail item 100 to determine the delivery point. The "delivery point" may include the recipient's name as well the recipient's address. The delivery point may then be transformed into a bar code, such as a POSTNET bar code containing the Zip-plus-four-plus-two recipient delivery point code, which is applied to the front of mail item 100 and used for further sorting. In another embodiment, has a unique, easy-to-determine identifier attached to it, (for example, an identifier bar code) and the delivery point is determined by looking it up in a database indexed by the identifier. The identifier and the corresponding database of information associated with the identifier may be supplied by the sender, because a database lookup to determine the delivery point is typically faster, easier to determine, and less error-prone than an OCR process.

In one embodiment, an OCR process is used just once to determine the delivery point, which is stored in a database with a unique identifier. Then, the same unique identifier is applied to mail item 100 in a fashion that makes the identifier easy to determine in subsequent tracking, removing the need for another pass through an OCR process. For example, a barcode may be applied directly to the mail item.

In stage 215 of the process, a notification is sent, e.g., to the recipient, to indicate that mail item 100 is en route to the delivery point. The notification may be sent by various ways, for example, via email, via telephone, via fax, or via pager. The notification may be sent to a wide variety of individuals or organizations. For example, the notification may be sent to the recipient and/or an individual authorized by the recipient. In addition, the notification may be sent to the sender or the mailer.

In one embodiment, the notification is sent to the recipient and the information necessary to contact the recipient (e.g., the recipient's email address or telephone number) is retrieved from a database, indexed by the delivery item's identifier. Notification contact information may be included in the sender supplied data referred to in the previous stage. Notification contact information may also be obtained from independent third-party sources. For example, a recipient's telephone number may be looked up in a phone book or on-line telephone directory website. In another embodiment, the recipient's contact information is affixed to the mail item, for example, as a bar code or data matrix code containing the recipient's email address.

In yet another embodiment, notification is via a conventional physically delivered letter that arrives while mail item 100 is in transit, sent from a post office local to the recipient. The letter is sent to the address to which mail item 100 is being delivered by a post office close to the recipient address. For example, when a mail item, such as mail item 100, is mailed from a sender in Boston, Mass., to a recipient in San Francisco, Calif., the San Francisco Post Office prints a letter to the recipient. The letter, informing the recipient that mail item 100 was mailed in Boston, is delivered to the recipient while mail item 100 is en route. The letter originating in Boston may then be actually printed and delivered in San Francisco in time to be delivered on the next day. Thus, the recipient is notified in sufficient time to provide instructions regarding mail item 100.

In one embodiment of a system consistent with the principles of the present invention, the recipient is notified that mail item 100 is en route soon after the delivery service takes initial possession of the mail item. Early notification reduces unnecessary transportation of the mail item. For example, if the recipient of the parcel being delivered from Boston to San Francisco wishes to have the parcel delivered to a hotel room in Chicago instead, early notification allows the recipient to redirect the parcel before it passes Chicago on its way to the West coast, saving time and transportation costs. In one variation of this embodiment, mail item 100 is not transported from the origin location until instructions are received from the recipient.

In another embodiment, the recipient is notified after mail item 100 has traveled some distance toward the addressed delivery point. Later notification allows the delivery service to more accurately inform the recipient when mail item 100 will arrive at the delivery point, because mail item 100 will be closer to the delivery point. With more accurate information, the recipient can better manage delivery of the mail item.

In yet another embodiment, the recipient is notified more than once as mail item 100 progresses along the delivery route. For example, the recipient is given an early notification that mail item 100 has been sent to him, without specifying a delivery date or specifying an estimated range of delivery dates. Later, after mail item 100 has been moved, the recipient is given another notification, specifying much more accurately the expected delivery date. In yet another embodiment, the recipient is notified after an actual delivery attempt fails—e.g., in a situation where a "yellow slip" would normally be left at the recipient address after the delivery attempt.

Although the above embodiments are described with the recipient receiving the notification, other individuals or organizations may receive the notification consistent with the principles of the present invention. For example, the sender may receive the notification simultaneously with the recipient. Alternatively, the sender may receive the notification rather than the recipient. Other variations of providing the notification to one or more individuals or organizations interested in delivery of the mail item are consistent with the principles of the present invention.

Next, systems and methods consistent with the principles of the present invention accept, e.g., from the recipient, instructions regarding delivery of mail item 100 (stage 220). The recipient may, for example, communicate instructions over the same channel used to notify the recipient in the previous stage (e.g., email, telephone, website, etc.). In one embodiment, the recipient's instruction include a new delivery point (e.g., "deliver to my office instead of my home"), a new delivery time (e.g., "deliver today at 7:00 p.m."), and other information, such as special delivery instructions (e.g. "place inside garage," or "hold item for one week, I will pick up at Post Office on that date"). In one embodiment, if the recipient makes no response to the notification, is delivered to the addressed delivery point according to procedures well known to those skilled in the art.

Instructions may be accepted from individuals or organizations other than the recipient. For example, systems and methods consistent with the principles of the present invention may accept instructions from the sender or the mailer. One skilled in the art would recognize that a wide variety of instructions sources may be used consistent with the principles of the present invention.

In stage 225, a notification is sent, e.g., to the sender (or mailer), to indicate acceptance of the instructions. As in stage 215, the notification may be sent to a variety of individuals or organizations, such as, the sender, the mailer, or the recipient. For example, a copy of the recipient's email delivery instructions can be forwarded to the sender. In one embodiment, the sender has final control over delivery and has the option to veto any alternate delivery instructions given by the recipient. To prevent fraud or for other reasons, the sender can direct that mail item 100 be delivered to the original address.

As in stage 215, the instruction acceptance notification may be sent by a variety of methods well known in the art, such as email, telephone, fax, letter, or electronic data exchange between data processing systems. Contact information for communicating, e.g., with the sender, may be retrieved from a variety of sources well known in the art. For example, it may be looked up in a database provided by the mailer, gotten from information written on the parcel (e.g., return address), or gotten from information encoded on the mail item using a bar code or data matrix code.

In stage 230 of the process, the new delivery instructions, e.g., from the recipient, are approved and the process proceeds to stage 235, or the instructions are vetoed and the process proceeds to stage 240. The instructions may be approved by a variety of individuals and organizations. For example, as noted above, the sender may retain final control over delivery of mail item 100. One skilled in the art would also recognize that approval of the instructions may be performed in a wide variety of ways. For example, in one embodiment, the sender compares the new delivery address to a list of previously specified acceptable delivery addresses for the recipient, and agrees if the new address is on the list. Agreeing only to pre-defined alternate addresses helps reduce fraudulent redirection of mail.

If the instructions are approved, mail item 100 is delivered according to the instructions (stage 235). In one embodiment consistent with the principles of the present invention, if the recipient has specified a new delivery point, a distinctive new label specifying the new address may be produced and affixed to mail item 100 in place of the original delivery address label, so that a delivery person reading the label will deliver mail item 100 correctly. The distinctive new label may be used to alert the mail carrier that the piece is automatically being redirected and adds a degree of fraud prevention. Similarly, the delivery address of mail item 100 contained in database 125 may be changed to reflect the new delivery point. In one embodiment, the label and database changes may be performed automatically, for example, by a system used by the U.S. Postal Service.

In stage 230, if the instructions are not approved, then mail item 100 is delivered according to the original address on mail item 100 (stage 235). One skilled in the art would also recognize that mail item 100 may be sent to destinations other than the original address, e.g., in the event of an undeliverable address. For example, in one embodiment consistent with the principles of the present invention, the mailer may specify a new delivery point for mail item 100 in this stage.

Next, the delivery service attempts to deliver mail item 100 to the final delivery point, which will generally be either a new delivery point as instructed or the original addressed delivery point. If mail item 100 is successfully delivered, then the process proceeds to stage 250. If mail item 100 is undeliverable, then the process proceeds to stage 260.

Mail item 100 may be undeliverable for any number of reasons well known to those of ordinary skill in the art. For example, the address may be invalid, the recipient may have moved, or nobody may have been home to accept the parcel during several redelivery and notification attempts.

If mail item 100 is successfully delivered, then in stage 250 a notification is sent to indicate that actual delivery has occurred. As with stages 215 and 225, the delivery notification may be sent to a variety of individuals or organizations, e.g., the sender, and may be done in a number of different ways, all consistent with the principles of the present invention. For example, as is known in the art, the delivery person may scan the identification barcode on mail item 100 when he places mail item 100 in the recipient's home mailbox. An internal clock in the scanner records the delivery time. When the scanner is then placed in a cradle in the delivery truck or at the local office, the delivery information is uploaded to a computer and placed in a database accessible to those trying to find delivery information for that item. Accordingly, the sender could confirm delivery using a "tracking number" and a website to access the database and learn the delivery information. The sender could then make that information available on the sender's website, so that a recipient customer of the sender could access it without knowing what shipping service was used, the "tracking number," or any other details. As is known to those skilled in the art, the notification confirming delivery, using any of a number of methods, some of which were previously described.

In one embodiment consistent with the principles of the present invention, the sender is notified of actual delivery using an image of the physical item as delivered. The image can show the new recipient-instructed delivery point on the address label and the physical condition (e.g., any damage) of mail item 100. The image may be provided electronically, for example, in JPEG format. It may be emailed to the sender, or put on a website with the URL emailed to the sender. Although images may require a very large amount of bandwidth and storage space, especially considering that millions of letters and parcels are delivered by, the U.S. Postal Service every day, and that a parcel with a surface area of 10×20 inches would require about two megabytes to store as an image. However, techniques known to those of ordinary skill in the art, such as data compression, reduces the required resources, especially since not all senders will want, or pay for, image notification. After the sender is notified of actual delivery, the process ends.

If mail item 100 is not deliverable in stage 245, then in stage 260 a notification is sent, e.g., to the sender, to indicate that mail item 100 was undeliverable and disposition instructions are requested. As with stages 215, 225, and 250, notifying and requesting can be done in several different ways, all consistent with the principles of the present invention. In addition, the undeliverable notification may be sent to a wide variety of individuals or organizations consistent with the principles of the present invention.

For example, as noted, the undeliverable notification may be sent to the sender. The sender can then provide a number of different disposition instructions to the shipping service in possession of the undeliverable item. For example, the sender may instruct the shipper to return mail item 100 to a return address printed on mail item 100, a return address associated with mail item 100 in a database, or a newly supplied return address. Alternatively, the sender may instruct the shipper to destroy mail item 100, auction it off, or donate it to a charity. A shipper may prefer these options to returning mail item 100 because in some cases when mail item 100 is undeliverable, it is cheaper not to return it. For example, consider an undeliverable $2.00 bottle opener. It may cost the sender $5.00 in handling and labor charges to accept the return, process it, and put the opener back in the inventory. In such a case, the sender may not want mail item 100 back. Instead they may simple want it destroyed, or auctioned off to recoup a share of the proceeds, or donated to charity to receive a tax benefit.

After disposition of mail item 100 is completed, a notification may be sent, e.g., to the sender, to indicate disposition of mail item 100 (stage 265). As with stages 215, 225, 260 and 265, notification may be sent to a wide variety of individuals or organizations and may be done in several different ways, all consistent with the principles of the present invention. At the completion of this stage, the process ends.

One skilled in the art will recognize that various stages of the process described can be modified, removed, and/or reordered without departing from the spirit and scope of the present invention. For example, stages 225, 230, and 240 may be removed and the resulting process will still comport with the principles of the present invention.

Other embodiments of the invention will be apparent to those skilled in the art from consideration of the specification and practice of the invention disclosed herein. For example, one skilled in the art would realize that the principles of the present invention encompass delivery services that implement the described invention completely manually, using an integrated manual/automatic process or a completely automatic process including a manual/automatic inspection, computerized databases or, paper databases, and manual phone calls. It is intended that the specification and examples be considered as exemplary only, with a true scope and spirit of the invention being indicated by the following claims.

What is claimed is:

1. A computer-implemented method for changing the delivery point of an item while the item is en route, comprising:
    determining, by a processor, a first delivery point from the item;
    responsive to the determining, notifying a recipient electronically, based on the first delivery point, that the item is en route;
    notifying a sender, based on an identifier of the sender obtained from the item, that the item is en route;
    accepting, by the processor, at least one instruction designating a second delivery point;
    receiving, by the processor, approval of the at least one instruction; and
    delivering the item to the second delivery point.

2. The method of claim 1, wherein accepting the at least one instruction comprises accepting the at least one instruction from the recipient.

3. The method of claim 1, wherein receiving approval of the at least one instruction comprises:
    receiving approval from the sender.

4. The method of claim 1, wherein delivering the item to the second delivery point comprises:
    notifying the sender, if actual delivery is made; and
    requesting disposition instructions from the sender, if delivery was not made.

5. A system for changing the delivery point of an item while the item is en route, comprising:
    a processor; and
    a memory coupled to the processor, the memory storing instructions to direct the processor to perform operations comprising:
    determining a first delivery point from the item;
    responsive to the determining, causing notification of a recipient electronically, based on the first delivery point, that the item is en route;
    causing notification of a sender, based on an identifier of the sender obtained from the item, that the item is en route;
    accepting a second delivery point from the recipient;
    receiving, by the processor, approval of the at least one instruction; and
    causing delivery of the item to the second delivery point.

* * * * *